United States Patent
Yaegashi

(10) Patent No.: US 6,315,722 B1
(45) Date of Patent: Nov. 13, 2001

(54) ULTRASONIC DIAGNOSTIC DEVICE

(75) Inventor: Mitsutoshi Yaegashi, Kanagawa-ken (JP)

(73) Assignee: Terumo Kabushiki Kaisha Shibuya-ku, Tokyo (JP)

( * ) Notice: Subject to any disclaimer, the term of this patent is extended or adjusted under 35 U.S.C. 154(b) by 0 days.

(21) Appl. No.: 09/538,237

(22) Filed: Mar. 30, 2000

(30) Foreign Application Priority Data

Mar. 30, 1999 (JP) .................................. 11-089000

(51) Int. Cl.[7] ........................................................ A61B 8/00
(52) U.S. Cl. ................................................................ 600/437
(58) Field of Search .................................... 600/437, 444, 600/447, 443, 455, 449, 448

(56) References Cited

U.S. PATENT DOCUMENTS 5,231,573 * 7/1993 Takamizawa ........................ 600/447
5,507,293 * 4/1996 Tannaka et al. ...................... 600/447
5,690,111 * 11/1997 Tsujino ................................. 600/450

FOREIGN PATENT DOCUMENTS

WO 97/09930   3/1997  (WO) .

* cited by examiner

*Primary Examiner*—Marvin M. Lateef
*Assistant Examiner*—Maulin Patel
(74) *Attorney, Agent, or Firm*—Burns, Doane, Swecker & Mathis, LLP

(57) ABSTRACT

An ultrasonic diagnostic device comprising an ADC 60 that converts signals to digital format, a time axis extension unit 70 that is capable of writing and reading the digital data, a data compression unit 80 that compresses the read data, a memory unit 90 that stores the compressed data, a data expanding unit that expands the compressed data stored in the memory unit, and a DAC 110 that converts the expanded data from a digital format to an analog format, wherein optimum images can be displayed for diagnosis by means of filtering, logarithmically converting, and detecting before inputting the data into the digital scan converter 210.

5 Claims, 3 Drawing Sheets

ULTRASONIC DIAGNOSTIC DEVICE

CROSS-REFERENCE TO RELATED APPLICATION

This application is based upon Japanese Patent Application No. 10-65733 filed on Mar. 30, 1998, and Japanese Patent Application No. 11-89000 filed on Mar. 30, 1999, the contents of which are hereby incorporated by reference.

BACKGROUND OF THE INVENTION

1. Field of the Invention

The present invention relates to an ultrasonic diagnostic device that enables to obtain diagnostically optimum images using stored data.

2. Description of the Related Arts

The ultrasonic diagnostic device has been used for diagnosis of diseased parts in body cavities.

The device transmits ultrasonic waves from its ultrasonic transducer attached to the distal end of a catheter inserted into a body cavity such as a vein or vessel, receives the echoes reflected from reflective members of the subject, and displays them as images on a display such as a CRT (cathode ray tube) after processing such as amplification and detection.

The operator of the device first inserts the ultrasonic catheter into the body cavity, and records the ultrasonic images on a video cassette as this ultrasonic catheter is being out or starting prior to that. After the operation, the recorded ultrasonic images will be reproduced to provide a detailed diagnosis for the subject.

However, the operator typically has contradicting desires, a desire to minimize the time of inserting the catheter, which is a foreign object, in the body cavity of the subject, and a desire to take as much time as possible for adjusting images to obtain optimum images during the operation.

As both of these desires cannot be satisfied simultaneously, the operator ends up compromising on the image adjusting time in reality.

Further, since the ultrasonic images are recorded on a video cassette recorder as video signals, it is impossible to add adjustments such as dynamic range adjustment, gamma correction, STC (sensitivity time control) and the like to the images after the operation, or to obtain images with altered circuit characteristics such as filter characteristics.

Therefore, it is difficult to conduct diagnosis based on optimum images using a device of the prior art and the development of a ultrasonic diagnostic device that provides images more suitable for diagnosis is desired.

SUMMARY OF THE INVENTION

An object of this invention is to provide an ultrasonic diagnostic device that makes it possible to perform signal processing after the operation by means of storing the obtained signals as special digital data, thus to be able to obtain optimum images for diagnosis.

The present invention with the intention of achieving said object comprises; an ADC (analog-digital converter) for converting signals received, which are ultrasonic waves transmitted to a subject by exciting an ultrasonic transducer built into a catheter and then reflected back from the subject; a time axis extension unit that is capable of writing the data obtained from said ADC as well as reading said data at a frequency lower than the frequency used at the time of writing; a data compression unit for compressing the data read by said time extension unit; a memory unit for writing the data compressed by said data compression unit; a data expanding unit for reading and expanding the compressed data stored in said memory unit; and a DAC (digital-analog converter) for converting the data expanded by said data expanding unit; wherein the analog output from said DAC is filtered, logarithmically converted, detected, converted into a digital format again, and inputted into a digital scan converter so that optimum images for diagnosis can be obtained.

Consequently, a device according to this invention can store image signals reflected from the subject as digital data so that optimum images for diagnosis can be obtained by processing the stored signals even after the operation.

This device can prevent noise interference and make the device configuration simpler as the stored digital data can be used as they are without having to convert them from a digital format to an analog format and converting back from an analog format to a digital format.

This device allows us to use a mass storage removable medium and to store a large volume of image data in said mass storage removable medium.

Furthermore, the applicability of this device can be widened by issuing output signals based on existing image standards.

DETAILED DESCRIPTION OF THE INVENTION

Embodiments of ultrasonic diagnostic devices according to the present invention will be described below with reference to the attached drawings.

Embodiment 1

Figure 1:
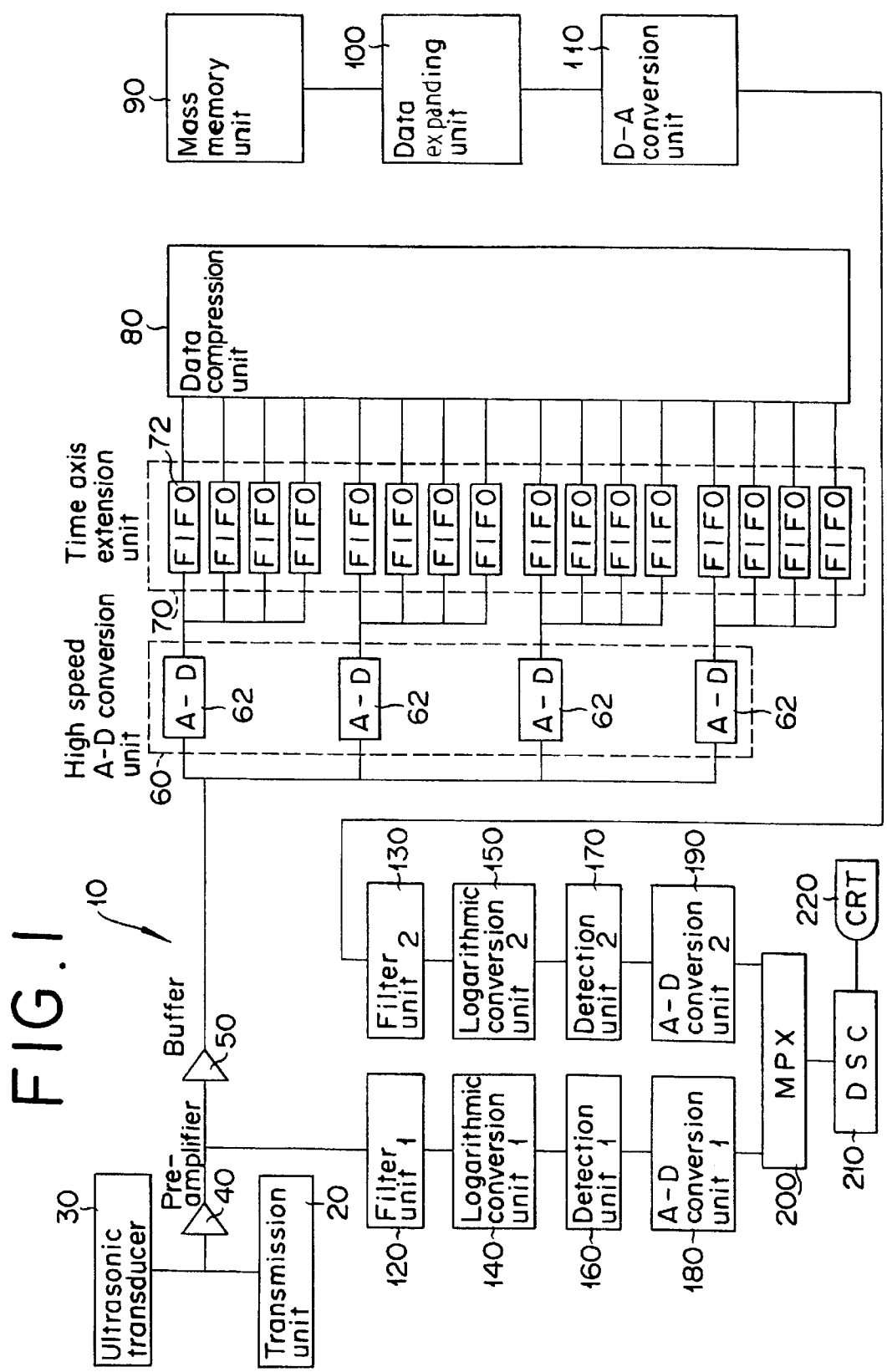
FIG. 1 is a schematic block diagram of an ultrasonic diagnostic device according to the embodiment 1 of the invention.

An ultrasonic diagnostic device 10 of the embodiment 1 shown in FIG. 1, is used to diagnosis of intravascular and other organ ailments and no different from ultrasonic diagnostic devices of the prior art in that a transmission unit 20 drives an ultrasonic transducer 30, signals reflected by a subject are received and amplified by a preamplifier 40, the signals are then filtered, logarithmically converted, and detected before inputted into a DSC (digital scan converter) 210, and images thus generated are displayed on a CRT 220.

Its differences from the ultrasonic diagnostic devices of the prior art are mainly the following two points.

The first difference is that it has a unit that enters the output of the preamplifier 40 via buffer 50 into a high speed ADC 60 for processing.

The second difference is that it has two sets of filtering units 120, 130, logarithmic conversion units 140, 150, detection units 160, 170, and ADC 180, 190 so that it is capable of selecting either real time image display or stored image display reading the data stored in a mass memory unit 90 by means of switching the input into the DSC 210 with a MPX (multiplexer) 200.

The device 10 of this embodiment 1 is capable of processing at the high speed ADC 60 and thereafter while displaying images in real time. Image display at CRT 220 in real time is accomplished by means of filtering, logarithmic conversion, detection and conversion from an analog format to a digital format using the first filter unit 120, the first logarithmic conversion unit 140, the first detection unit 160, and the first ADC 180, via the MPX 200 and the DSC 210.

On the other hand, the image display of the stored data is accomplished at CRT 220 by means of filtering, logarithmic conversion, detection and conversion from an analog format to a digital format using the second filter unit 130, the second logarithmic conversion unit 150, the second detection unit 170, and the second ADC 190, via the MPX 200 and the DSC 210.

Following the high speed ADC 60 are a time axis extension unit 70 that is capable of writing as well as reading said data at a frequency lower than that the frequency used at the time of writing, a data compression unit 80 that compresses the data read by the time axis extension unit 70, a mass memory unit 90 that writes the data compressed by the data compression unit 80, a data expanding unit 100 that reads and expands the compressed data stored at the mass memory unit 90, and a DAC 110 that converts the data expanded by the expanding unit 100.

The high speed ADC 60 is equipped with multiple analog-digital conversion ICs 62 and the time axis extension unit 70 is equipped with multiple FIFO memories 72 each of which corresponds to each of the analog-digital conversion ICs 62.

Now, one example of the embodiment will be described how these parts operate using a case where the ultrasonic frequency is 30 MHz.

If the ultrasonic frequency is 30 MHz, an appropriate display depth radius is 5 mm considering the signal attenuation. If the speed of sound in a human body is 1530 m/s, the recording length for one line of transmitting and receiving of the ultrasonic wave (hereinafter called sound ray) is:

$$5 \text{ (mm)} \times 2 / 1530 \text{ (m/s)} = 6.54 \text{ } (\mu s)$$

Since the signal frequency is 30 MHz, the sampling frequency is eight times of it, i.e., 240 MHz. The data volume for one sound ray is:

$$6.54 \text{ } (\mu s) \times 240 \text{ (MHz)} = 1570 \text{ (word)}$$

Since the dynamic range of the ultrasonic diagnostic device 10 is required to be about 60 dB, it is necessary to have a dynamic range of 60 dB or more in order to do an analog-digital conversion of the original signals, which are RF (radio frequency) signals. Some of the ICs intended for analog-digital conversion currently available on the market are 10 bit products, whose dynamic range is:

$$20 \log 2^{10} = 60.2 \text{ dB}$$

so that they satisfy the requirement.

The maximum sampling frequency for a 10 bit high speed IC 62 to be used for analog-digital conversion use (e.g., A-D9070 by Analog Devices, Inc.) is 100 MHz so that four of these IC 62 for the analog-digital conversion is used to achieve 240 MHz setting the frequency for each IC 62 for the analog-digital conversion as 60 MHz. The sampling clock of each IC is a four phase clock. The memory for writing the data resulting from the analog-digital conversion is a FIFO memory 72 intended for image use.

The FIFO memory 72 for the image use available on the market typically has a minimum clock cycle of 30 ns and a bit configuration of 256 k word×8 bit (e.g., MN4777AS by Matsushita Electric Industrial Co., Ltd).

Since the data is 10 bits per word, it is used by dividing them into two groups of lower 8 bits and upper 2 bits. As to the 60 MHz writing clock, the available speed is not fast enough, but it can be compensated by allocating two of them to each of said lower 8 bit and upper 2 bit ranges using divided 30 MHz two-phase clocks. In other words, four FIFO memories 72 are connected to each of the four analog-digital conversion IC 62.

Under such a configuration, the amount of data that can be written into the time axis extension unit 70 (consisting of 16 FIFO memories 72) is 256 (k word)×2×4=2048 (k word).

Since the number of sound rays per screen is 500 or so, we assume that it is 525 lines for the sake of argument. That makes the amount of data per one sound ray is 1570 (word), so that the amount of data per screen is:

$$1570 \text{ (word)} \times 525 = 824 \text{ (k word) } [10 \text{ (bit)} \times 824 \text{ (k word)} = 8.24 \text{ (M bit)}]$$

so that two page worth of images can be written on the aforementioned 2048 k word capacity.

Since writing and reading can be done independently on the FIFO memory 72 assumed on this embodiment, it is possible to read one screen worth of data of the previous screen while writing the data for the next screen (if a FIFO memory 72 used does not allow writing and reading independently, two systems can be used to overcome the shortcoming).

Since reading of this FIFO 72 memory can be done with a 30 ns clock, it takes $$30 \text{ (ns)} \times 824 \text{ (k word)} = 24.72 \text{ (ms)}$$

to read one screen worth of data (with the configuration described above where the FIFO memory 72 has four independent clock systems, it is possible to read it in about ¼ of the time, i.e., in 6 ms, if the reader side clock cycle is fast enough).

The commonly used frame rate, i.e., 33 ms (frame interval) is appropriate for the data collection interval for each screen. Therefore, it is possible to use a time axis extension of executing the high speed analog-digital conversion in 240 MHz and data reading in 33 MHz (30 ns cycle).

This data is compressed in real time and written into HD (hard disk), a mass memory device. A typical 3.5 inch HD available on the market has a rotating speed of 7200 rpm, line recording density of 120 k BPI, and a maximum data transfer speed of 120 M bit/s.

Therefore, the data that can be transferred during one frame interval is:

$$120 \text{ (M bit/s)} \times 33 \text{ (ms)} = 120 \text{ (M bit)} / 30 = 4 \text{ (M bit)}.$$

As the required transfer data is 8.24 M bit as mentioned above, it is obvious that it has to be compressed into ½ or more.

The maximum data transfer speed of an HD depends on the magnetic material of the recording head, and even the magnetic material currently used on the conventional HD can accommodate up to 200 M bit/s by means of increasing the rotating speed.

Therefore, there is a high probability that there will be no more "requirement for compression to enable the transfer" in case of HDs to be developed in the near future (although there will always be a need for compression for the sake of minimizing the memory capacity requirement).

As for the principle of compression, technologies similar to those which have been used commonly for image compression can be applied here.

Typical image compression technologies include:

(a) information compression method using differences from a certain reference screen; and (b) information compression method using DCT (discrete cosine transformation) utilizing correlation in space within a screen.

For example, in case of the MPEG (moving picture expert group) method,100 Mbit/s can be compressed 1/25 to 4 Mbit/s. In case of the RF signal, $$8.24 \text{ (M bit)} \times 30 \text{ (frames)} = 247 \text{ (M bit/s)}$$

so that it is a difference of about 2.5 times and it can be used in principle.

Since FIFO memory 72 stores data that is comparable to one screen, it is possible to compress information within a screen equivalent to the technology (b) mentioned above, and the technology (a) mentioned above can be accomplished by arranging multiple FIFO memories 72. Compression can be achieved by calculation using high speed CPU (central processing unit) and DSP (digital signal processor) or dedicated equipment.

For example, if the data is compressed 1/3, the bit rate becomes:

$$247 \text{ (M bit/s)}/3 = 82 \text{ (M bit/s)}$$

so that the transfer speed of HD is sufficient.

A typical operation using an ultrasonic diagnostic device is about 15 minutes at most, and the data volume exchanged during that time can be calculated as:

$$82 \text{ (M bit/s)} \times 60 \text{ (s)} \times 15 \text{ (min)} = 72.1 \text{ (G bit)} = 9.01 \text{ (GB)}$$

One of the HD products with large memory capacities that can be easily obtained on the market today has a capacity of 4.2 GB, while many systems used for image handling can be expanded up to 16 GB. Therefore, assuming the capacity of HD is 16 GB, it is possible to write 15 minutes worth of data into a HD.

Moreover, when the HD's data transfer speed increases in the future and the volume increases, it is possible to make use of a method of keep writing as the information comes in without compressing it in real time and compressing only after the operation taking enough time to do so. Such a method is advantageous in terms of simplification of the device configuration and possibility of reversible compression as in the case of LHA by providing a broader choice of compression methods as it is not a real time processing.

As it provides information of about 9 GB for one operation, there is a need for writing the data into mass memory removable media such as a CD-R (compact disk recorder), MO (magneto optical), DVD-RAM (digital versatile disc-random access memory), etc.

The capacities of these mass memory removable media are typically:

CD-R: 640 MB

MO: 2.6 GB (max)

DVD-RAM: 5.2 GB (max)

This means that a single mass memory media disk does not provide a sufficient capacity. Therefore, it is necessary to take measures such as:

(i) simply use multiple disks, for example, two DVD-RAMs; or (ii) it is necessary to compress data in real time when writing 9.01 GB of data in HD, but there is no need for compressing the data already written on HD in real time so that it can be done by recompressing the data taking enough time so that the data can be stored in a media disk such as MO. The compression in case of (ii) can be done by CPU, DSP, etc.

On the other hand, if the image is to be configured (reproduced) using the data stored in mass memory removable media, it is first written into HD (to be written after having been expanded if it has be recompressed as in the case of (ii) above), expanded and digital-analog converted. The clock used during the digital-analog conversion does not have to be the clock used during the high speed analog-digital conversion. For example, in the example shown above, there are 525 sound rays for the frame cycle 33 ms, so that the time for each sound ray is:

$$1/30/525 = 63.5 \ (\mu s)$$

making it about 10 times longer than the recording length 6.54 $\mu s$ during the data writing, so that the clock can be 10 times slower.

It will be described about here a case of making it eight times slower, i.e., reducing the speed from 240 MHz to 30 MHz. This makes the frequency of the original signal slow down 1/8 times from 30 MHz to 3.75 MHz. This is a frequency that can be more readily handled in an analog mode compared to the original frequency of 30 MHz.

After filtering, logarithmic conversion, and detection (hereinafter envelope detection is assumed), the analog output obtained by shifting the frequency is inputted into DSC 210 to display images. In order to obtain images with altered filtering characteristics, several filters with different characteristics can be used and selected as needed.

The embodiment described above is based on an assumption that the frequency is 30 MHz, but the configuration same as the one for the sampling frequency of 120 MHz can be used for 15 MHz with a display depth of 10 mm. In other words, the upper limit of the frequency being handled determines the clock frequency for high speed analog-digital conversion, and the clock frequency determines the capacity of the time axis extension unit 70 (FIFO memory 72). If the frequency being handled is lower than the upper limit, the clock frequency can be reduced so that the record length can be handled within the capacity of the time axis extension unit 70.

Although we did not describe about the control of the motor that rotates the catheter as well as the motor rotating angle and the data transmission/reception timing, it is obvious that the embodiment can be realized using the same design as the prior art.

Embodiment 2

Figure 2:
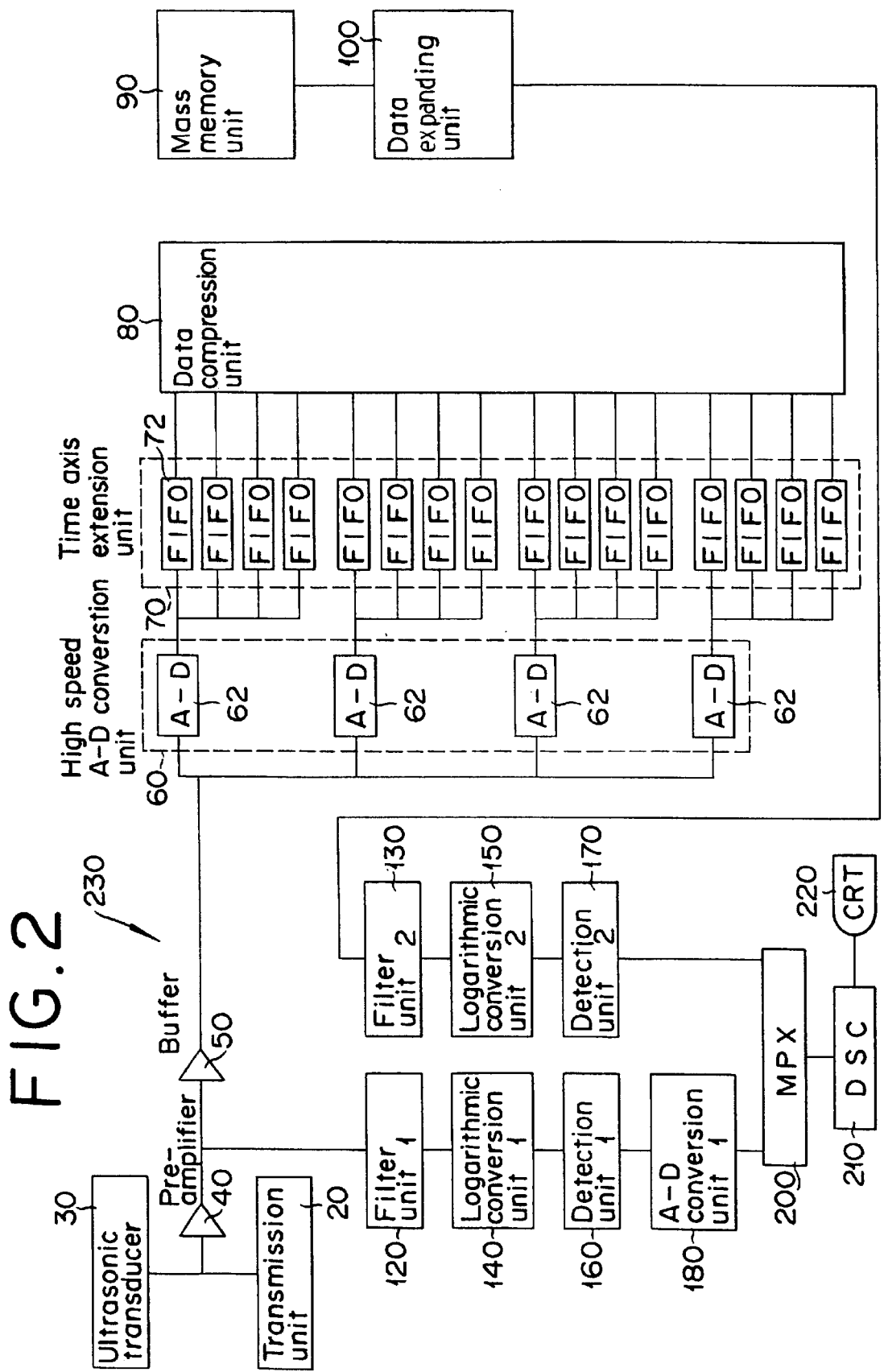
FIG. 2 is a schematic block diagram of an ultrasonic diagnostic device according to the embodiment 2 of the invention.

The embodiment 2 shown in FIG. 2 conducts filtration, logarithmic conversion, and detection on expanded digital data, without going through the digital-analog conversion process, and inputs the digital data into the DSC 210 to display images. The parts of the embodiment 2 which perform the same function as in the embodiment 1 are identified with the same codes, so that their descriptions do not have to be repeated here.

In FIG. 2, a device 230 of the embodiment 2 is different from the device 10 of the embodiment 1 in that it doesn't include the DAC 110 for applying the digital-analog conversion to the data expanded by the data expanding unit 100 and the second ADC 190 for applying the analog-digital conversion to the filtered, logarithmically converted, and detected.

Since the frequency of the original signal is lowered from 300 MHz to 3.75 MHz in the second embodiment, the filter of this signal can be a conventional digital filter (can be realized using CPU, DSP, etc.) causing benefits such as the improvement of transient characteristics and the prevention of oscillation. Also, the logarithmic conversion can be realized with the use of CPU, DSP, etc., resulting in an improved linearity of the conversion. Moreover, the detection can also be realized with the use of CPU, DSP, etc., resulting in an improved transient characteristics.

Embodiment 3

Figure 3:
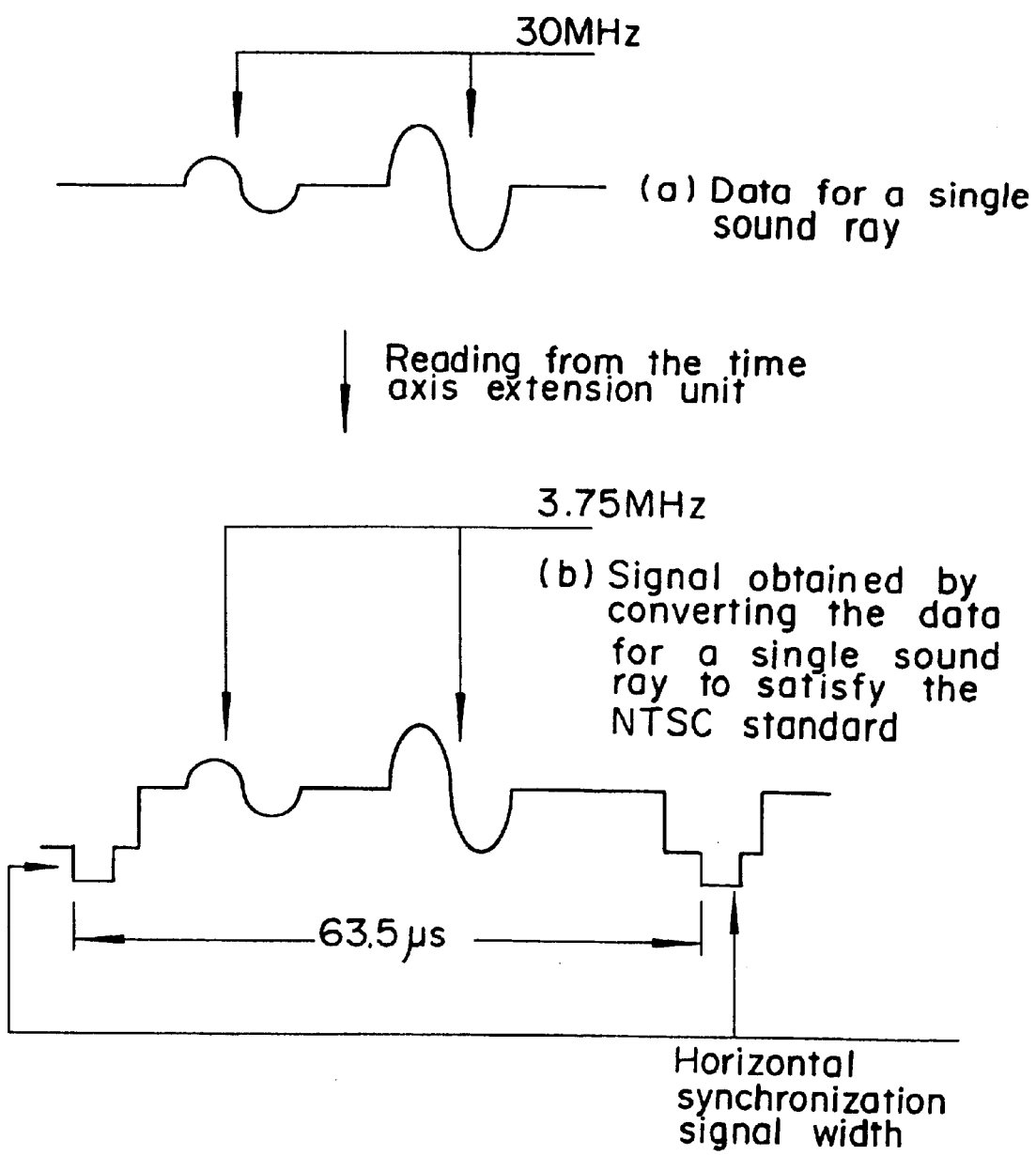
FIG. 3 is an explanatory drawing for signals outputted by an ultrasonic diagnostic device according to the embodiment 3 of the invention.

In the embodiment 3 shown in FIG. 3, the analog signal obtained by applying the digital-analog conversion to the data read by the time axis extension unit 70 conforms to the NTSC (National Television System Standard Committee) standard or the PAL (Phase Alteration by Line System) standard. In other words, the output has the square wave RF signal extended along the time axis with its level adjusted to match the brightness level of the image (within 1 Vpp in case of the NTSC standard) as shown in FIG. 3. Also, the sound ray is matched with the scanning line of the image.

If the number of sound rays is 525, it is possible to make them correspond with the scanning lines one to one. In this case, there is an advantage that the commercial image compression boards (e.g., MPEG board) are applicable for the compression in terms of hardware and software.

However, in case the compression is applied within the image data of a single screen (spatial compression), the correlation will be smaller such that the 264-th scanning line exists between the first and the second line if a simple correspondence in the order of the number is attempted in case of the NTSC standard as it uses the interlace scanning method. In order to achieve a more efficient compression, it is necessary to make a correspondence such as shown below, in which case, a buffer memory will be needed:

| Sound ray number | Scanning line number |
|---|---|
| 1 | 1 |
| 2 | 264 |
| 3 | 2 |
| 4 | 265 |
| : | : |
| : | : |
| 523 | 262 |
| 524 | 525 |
| 525 | 263 |

The embodiments described above are given only as examples, and they should not be construed to limit the scope of the invention in any way. The invention can be modified in various ways within the scope of the claims.

What is claimed is:

1. Ultrasonic diagnostic device comprising:

an ADC that transmits ultrasonic waves to a subject by exciting an ultrasonic transducer built into a catheter and converts signals obtained as the waves are reflected by said subject to digital format;

a time axis extension unit that is capable of writing the data received from said ADC and reading said data at a frequency lower than a frequency used during the time of writing;

a data compression unit that compresses the data read by said time axis extension unit;

a memory unit that stores the data compressed by said data compression unit; and a data expanding unit that expands the compressed data stored in said memory unit;

wherein optimum images can be displayed most suitable for diagnosis by means of filtering and logarithmically converting the data expanded by said data expanding unit before inputting the data into a digital scan converter.

2. The device according to the claim 1, wherein the device can be connected to a mass memory removable medium that is capable of writing and reading data between the device and said memory unit.

3. Ultrasonic diagnostic device comprising:

an ADC that transmits ultrasonic waves to a subject by exciting an ultrasonic transducer built into a catheter and converts signals obtained as the waves are reflected by said subject to digital format;

a time axis extension unit that is capable of writing the data received from said ADC and reading said data at a frequency lower than a frequency used during the time of writing;

a data compression unit that compresses the data read by said time axis extension unit;

a memory unit that stores the data compressed by said data compression unit;

a data expanding unit that expands the compressed data stored in said memory unit; and a DAC that converts the data expanded by said data expanding unit;

wherein optimum images can be displayed for diagnosis by means of filtering, logarithmically converting, detecting and converting the output data of said DAC from an analog format to a digital format before inputting the data into a digital scan converter.

4. The device according to the claim 3, wherein the device can be connected to a mass memory removable medium that is capable of writing and reading data between the device and said memory unit.

5. The device according to the claim 3, wherein the analog signal outputted by said DAC corresponds with at least either the NTSC standard or the PAL standard.

* * * * *